United States Patent [19]

Matsumoto et al.

[11] Patent Number: 4,476,528
[45] Date of Patent: Oct. 9, 1984

[54] METHOD AND APPARATUS FOR CONTROLLING A DATA ACCESS IN A DATA BASE MANAGEMENT SYSTEM

[75] Inventors: Yoshihiro Matsumoto; Kunio Takezawa; Ken Masegi, all of Tokyo, Japan

[73] Assignee: Tokyo Shibaura Denki Kabushiki Kaisha, Kawasaki, Japan

[21] Appl. No.: 409,862

[22] Filed: Aug. 20, 1982

[30] Foreign Application Priority Data

Sep. 2, 1981 [JP] Japan ................................ 56-138180

[51] Int. Cl.[3] .............................................. G06F 15/40
[52] U.S. Cl. .................................... 364/200; 364/300
[58] Field of Search ... 364/200 MS File, 900 MS File, 364/300

[56] References Cited

U.S. PATENT DOCUMENTS 4,096,567  6/1978  Millard et al. ...................... 364/200

OTHER PUBLICATIONS

"A Relational Model of Data for Large Shared Data Banks", by E. F. Codd, Communications of ACM, vol. 13, No. 6, 1979, pp. 337-387.
"Primo[1] Data Base Management System", by: H. Koller and K. Frühauf, Brown Boveri Review, Mar. 1979, pp. 204-209.

Primary Examiner—Raulfe B. Zache

Attorney, Agent, or Firm—Oblon, Fisher, Spivak, McClelland & Maier

[57] ABSTRACT

Data access in a data base management system is controlled. The method for controlling the data access in a computer having a first memory and a sub memory, both for storing data required to execute a program, including at least one data operation instruction comprises the steps of transferring data required by the data operation instruction from the sub memory to a location in the first memory, prior to execution of the data operation instruction, and informing the data operation instruction of the address of the location of the data required thereby, prior to execution of the data operation instruction. The apparatus for controlling data access comprises a sub memory for storing a data base and programs including at least one task unit having at least one data operation instruction, a first processor for executing each task unit stored in the sub memory, a first memory for storing programs and data executed by the first processor, a second processor connected to the sub memory, and a second memory for storing programs and data executed by the second processor, whereby the first processor executes the task unit read out from the sub memory, while the second processor reads out the data from the sub memory specified by the data operation instruction included in the task unit, based on the parameter supplied from the first processor and stores the data read out from the sub memory and corresponding addresses in the first memory.

9 Claims, 20 Drawing Figures

DAPR

| OUT NO | ALM NO | DTTYP | SUBU | EUCON | | LIMITS | |
|---|---|---|---|---|---|---|---|
| | | | | A | B | LIMIT 1 | LIMIT 2 |
| 1 | 2 | P | U1 | 2 | 100 | 300 | 200 |
| 1 | 2 | P | U2 | 2 | 50 | 250 | 150 |
| 2 | 2 | Q | U1 | 1 | -100 | 200 | 100 |
| 2 | 3 | V | U3 | 5 | 154 | 175 | 169 |
| 2 | 4 | F | U1 | 1 | 50 | 52 | 48 |

FIG. 5

| ITEM NAME | DB SUBSET START LOCATION | SIZE | TYPE | ADDRESS TO BE TRANS-FERRED | RETRIEVAL KEY |
|---|---|---|---|---|---|
| DTTYP | 0 | 1 | C | 1000 | 1 |
| TUPLENO | 2 | 4 | I | 1001 | 0 |
| A | 6 | 2 | I | 1005 | 0 |
| B | 8 | 2 | I | 1007 | 0 |
| LIMIT 1 | 10 | 4 | I | 1009 | 0 |
| LIMIT 2 | 14 | 4 | I | 1013 | 0 |

FIG. 6

| DTTYP | TUPLENO | EUCON | | LIMITS | |
|---|---|---|---|---|---|
| | | A | B | LIMIT 1 | LIMIT 2 |
| P | 1 | 2 | 100 | 300 | 200 |
| P | 2 | 2 | 50 | 250 | 150 |

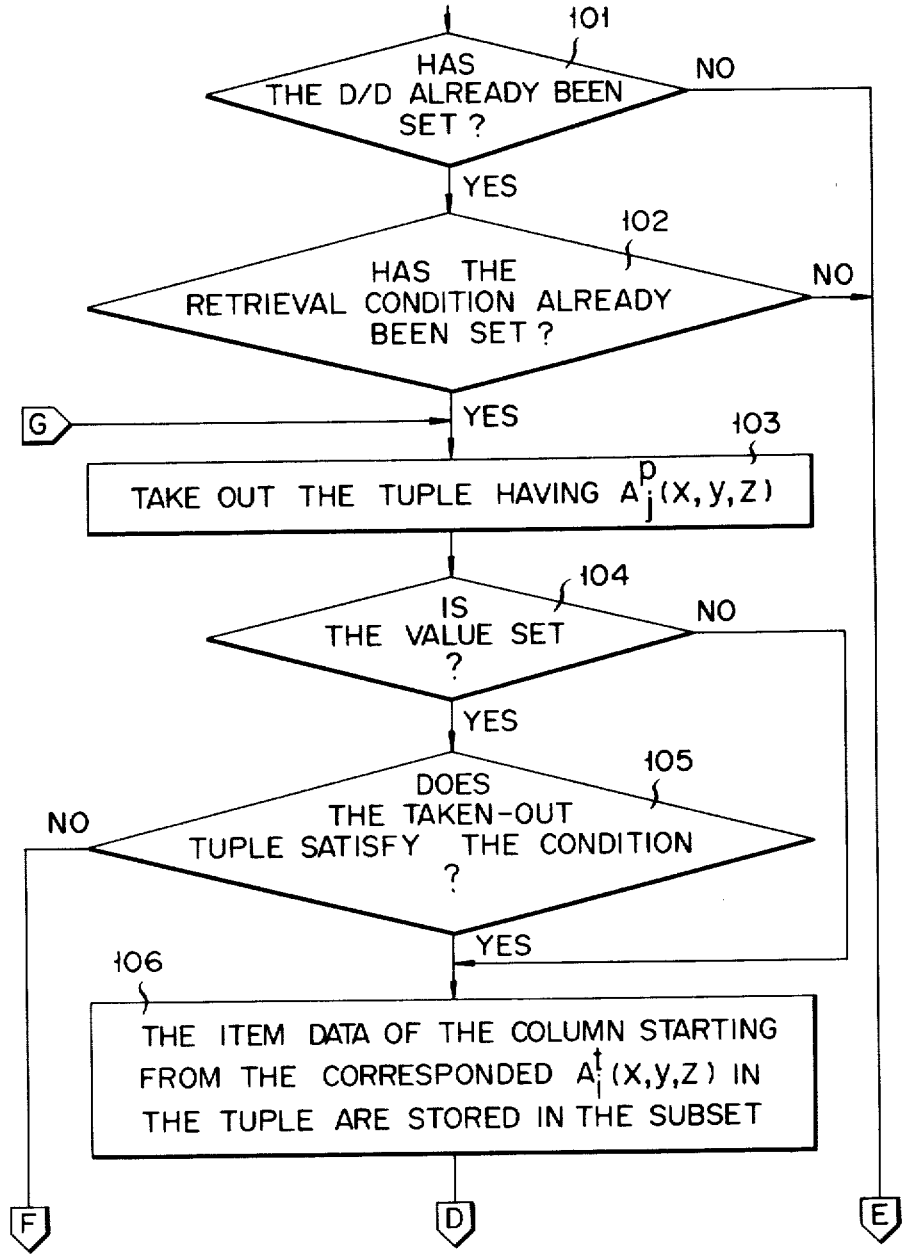

F I G. 11B
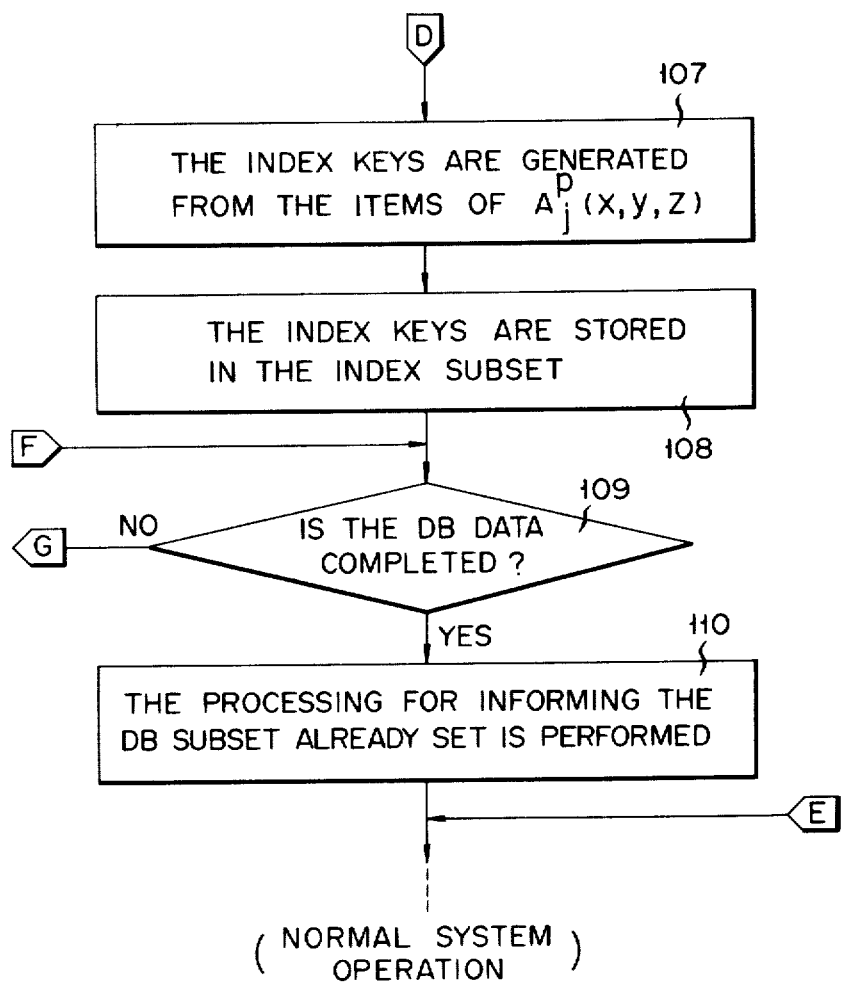

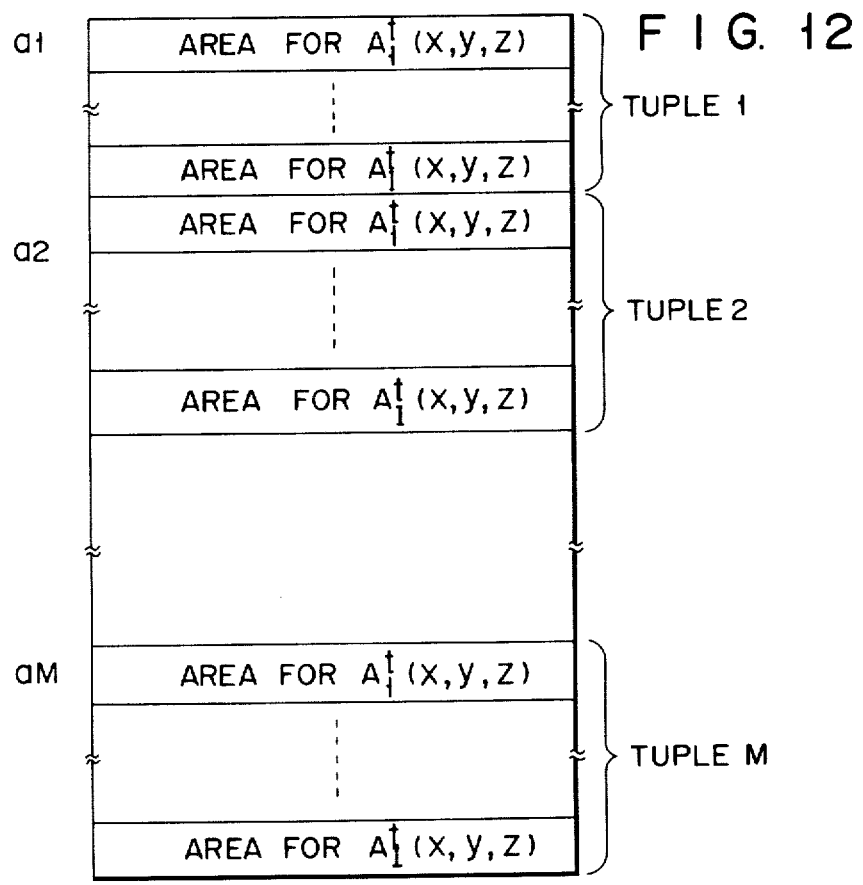
F I G. 12
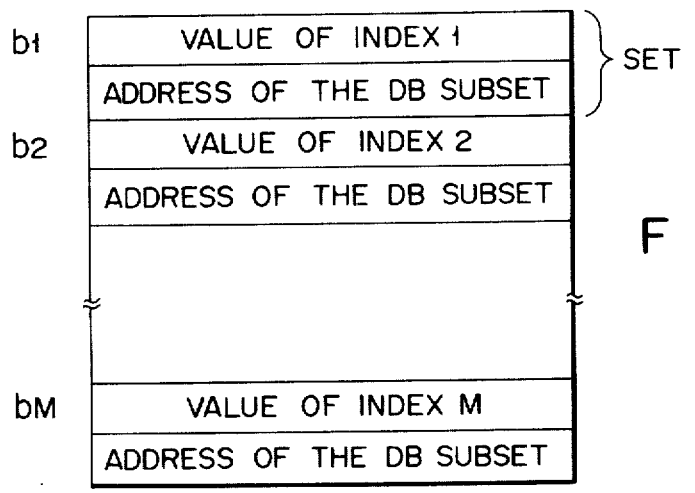
F I G. 13

F I G. 14A

| MACRO TYPE | MACRO-INSTRUCTION | 1 | 2 |
|---|---|---|---|
| PREPROCESSING INSTRUCTION | PERMIT | PERMISSION CLASS | SCHEMA NAME |
| | TRGTCNV | PROCESSING STATUS | PERMISSION LIST |
| | PRDCTCNV | PROCESSING STATUS | PERMISSION LIST |
| OPERATION INSTRUCTION | GET | PROCESSING STATUS | THE NUMBER OF RETRIEVAL TUPLES |
| | PROJECT | PROCESSING STATUS | THE NUMBER OF RETRIEVAL TUPLES |
| | UPDATE | PROCESSING STATUS | DATA AREA |
| | PUT | PROCESSING STATUS | DATA AREA |
| | DELETE | PROCESSING STATUS | RETRIEVAL INDEX |
| SIMULTANEOUS EXECUTING CONTROL INSTRUCTION | LOCK | PROCESSING STATUS | PERMISSION LIST |
| | UNLOCK | PROCESSING STATUS | PERMISSION LIST |

F I G. 14B

| 3 | 4 | 5 | 6 |
|---|---|---|---|
| RELATION NAME | PERMISSION LIST | | |
| RELATION NAME | ATTRIBUTE NAME | DATA DIRECTORY | |
| RETRIEVAL CONDITION | KEY VALUE ADDRESS | RETRIEVAL INDEX | |
| DATA AREA | AREA SIZE | DATA DIRECTORY | RETRIEVAL INDEX |
| DATA AREA | AREA SIZE | DATA DIRECTORY | |
| DATA DIRECTORY | RETRIEVAL INDEX | | |
| DATA DIRECTORY | RETRIEVAL INDEX | | |
| REQUEST LIST | | | |
| THE NUMBER OF ARTICLES | | | |

METHOD AND APPARATUS FOR CONTROLLING A DATA ACCESS IN A DATA BASE MANAGEMENT SYSTEM

BACKGROUND OF THE INVENTION

This invention relates to a data base management system, and more particularly to a method and a device for controlling data access.

Application programs executed in a computer are divided into a plurality of units and the execution of each unit is managed under the control of an operating system. A task represents a locus of control for the execution of a program unit called task unit.

As a basic technology for the effective management of the data which are stored in a computer and are utilized by multiple numbers of tasks, a concept called data base has been applied. The system for managing the data base is generally called Data Base Management System (hereinafter referred to as DBMS).

The purpose of data base technology is to centralize data files prepared for each application in each organization.

When data is managed with separate concentration from all task units, the user can maintain the data easier than before, as a result of the reasonable management. On the other hand, such management will tend to result in longer retrieval time. To improve this, various considerations are necessary when constructing the data base management system.

The physical form of data base is a group of data codes stored in a memory. Users do not directly manipulate the physical form of data but manipulate the abstract data model. The data model represents the user's view of what is the data base. Furthermore, data sub-language (DSL) or data manipulation language (DML) is available for the user to access to the data model. Data definition language (DDL) is provided for the users to build the data model. Among the conventional data models, hierarchical data model, the network-type data model and the relational data model has been widely known. The data model adopted in the embodiments of the present invention is the third one.

The data base is stored in a sub storage device such as a magnetic disk device. The minimum logical unit of the data model is called an item. The data model defines the logical relations between each item. The DBMS consists of two sections: the data base definition section in which the data model is defined and the respective items are assigned to be fitted into the data model and the operation section which treats retrieving, adding, deleting and updating of the data base.

In a computer system using a prior DBMS or in a prior data base machine, the data operation instruction is decoded when data manipulation instructions are fetched and executed. At this moment, the sub memory is accessed and the object data is transferred to the main memory to be used by the instruction.

Therefore, when an item in the data base is read out and processed in a computer provided with the prior DBMS, time, in the order of milliseconds, is taken to specify the object item and perform the operations (i.e. retrieval, addition, deletion and updating) in the DBMS operation field, even in the simplest operation such as GET one item (which is an operation of reading out data from the storage and loading it into a predetermined register). Because of this, the DBMS made by an ordinal method is hard to be applied to an application which requires high speed operation such as in the case of real time control, which requires the order of microseconds for the operation described above.

SUMMARY OF THE INVENTION

The present invention has been intended in view of the above deficiencies, and accordingly its major object is to provide a method and a device for controlling data access in a data base management system wherein the necessary time for specifying the object item and performing the operations (i.e. retrieval, addition, deletion and updating) in the DBMS operation field is in the order of microseconds, so that high speed operation (i.e. retrieval, addition, deletion and updating) can be achieved.

To achieve the above object, there is provided a method according to the present invention, for controlling data access in a computer having first storage means and second storage means, both for storing data required to execute a program, including at least one data operation instruction comprising the steps of:

transferring data required by said data operation instruction from said second storage means to a location in said first storage means, prior to execution of said data operation instruction; and informing the data operation instruction of the address of said location of the data required thereby, prior to execution of the data operation instruction.

According to the present invention, a target list (the list of data to be used by the data manipulation instruction) and a predicate list (the logic list describes how the target data are processed) are declared when each program unit is programmed. As a result of the compilation and loading of the program, the target lists and the predicate lists for all task units are prestored in a second main storage device.

A first central processing device (which is called a main processor) feeds a task number to a second central processing device (which is called a sub processor) as a parameter when each task unit is executed. As a result, the main processor executes the task i while the sub processor finds target and predicate lists in the second memory and obtains the object items that each data operation instruction requires from the sub memory. The object items obtained from the sub memory are transferred to locations of the first memory. Accordingly, the main processor can allocate the object item. If the object items are prepared prior to the execution of the data manipulation instructions, extreme high speed data operation will be accomplished.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 is a table illustrating the data directory generated in the preprocessing section of the present invention;

FIG. 6 is a table illustrating the data base subset generated in the preprocessing section of the present invention;

FIG. 11 is a flow chart for generating the data base subset of the present invention;

FIG. 12 is a table illustrating the allocation of the data base subset in the main memory of the present invention;

FIG. 13 is a table illustrating the allocation of the index subset in the main memory of the present invention;

FIG. 14 is a table illustrating an example of the subroutine call instruction and associated parameters of the present invention;

DETAILED DESCRIPTION OF THE PREFERRED EMBODIMENTS

Figure 1:
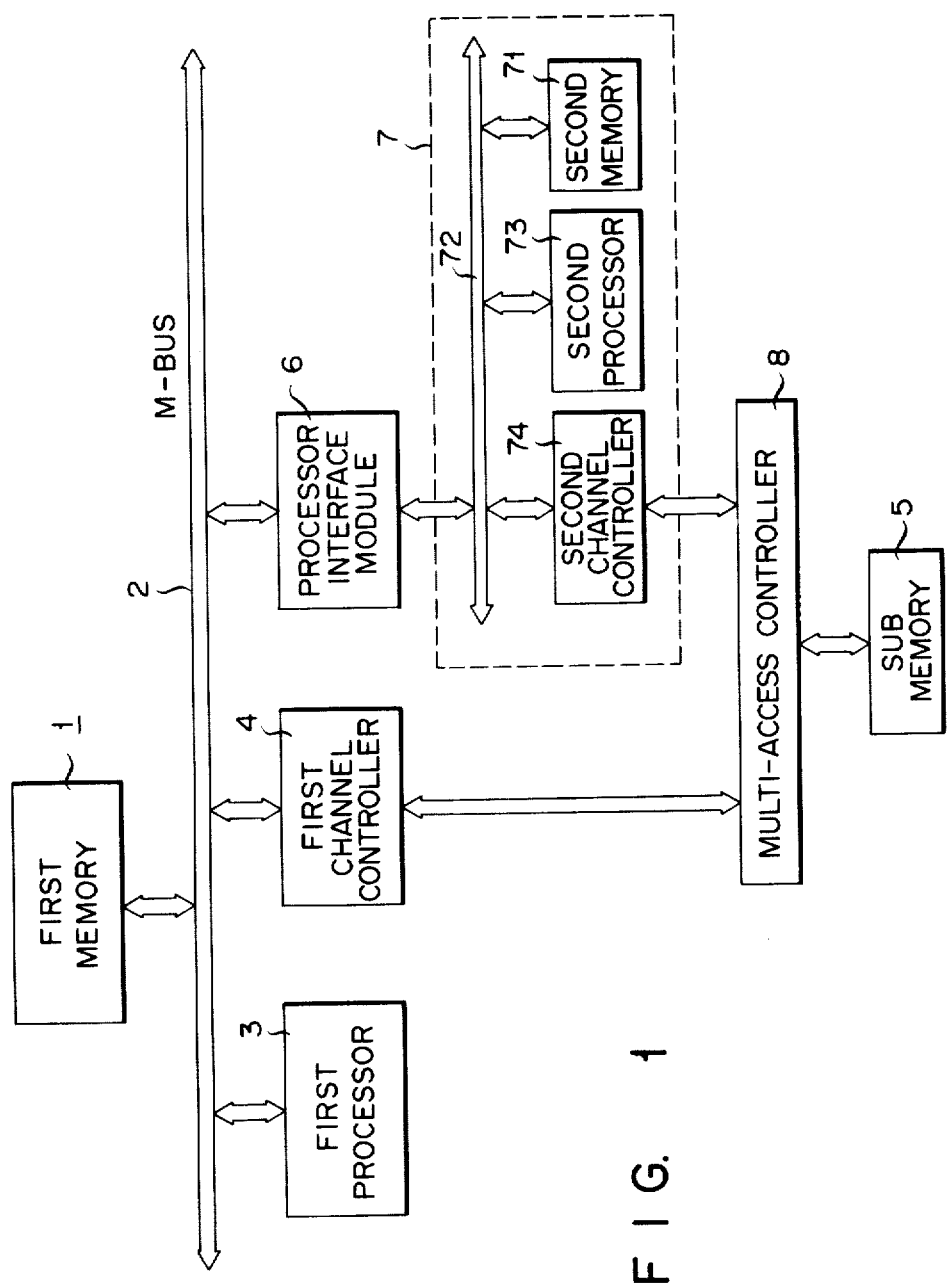
FIG. 1 is a block diagram showing one embodiment of the present invention.

Referring now to the drawings, wherein like reference numerals designate identical or corresponding parts throughout the several views, and more particularly to FIG. 1 thereof, a block diagram of the construction of the computer for realizing the present invention is shown. A memory bus 2 is connected to a first memory 1, a first processor 3, a channel controller 4 for controlling a sub memory 5 and a processor interface module (PIM) 6. In accordance with signals from the first processor 3 or the second processor 73, the PIM 6 allows the data stored in the memory 1 to be transferred to a second memory 71 through the PIM 6 and a memory bus 72 of a computer 7 or the data stored in the second memory 71 to be transferred to the first memory 1 through the reverse path mentioned above. The computer 7 includes the second processor 73 and a second channel controller 74. A multi-access controller 8 allows the sub memory 5 to alternatively be connected to either the first channel controller 4 or the second channel controller 74 in accordance with the signals from the first or second processor 3 or 73. The program to be executed by the first processor 3 is stored in the sub memory 5 and is divided into the program units. A program (which is also called an operating system) for controlling the execution of the task units and the data base management program (referred to as DBM) is stored in the first and second memories 1, 71 and the sub memory 5. The processor interface module (PIM) is explained in detail in U.S. Pat. No. 4,123,794 for a Multi-computer System, which is incorporated by reference herein.

Figure 2:
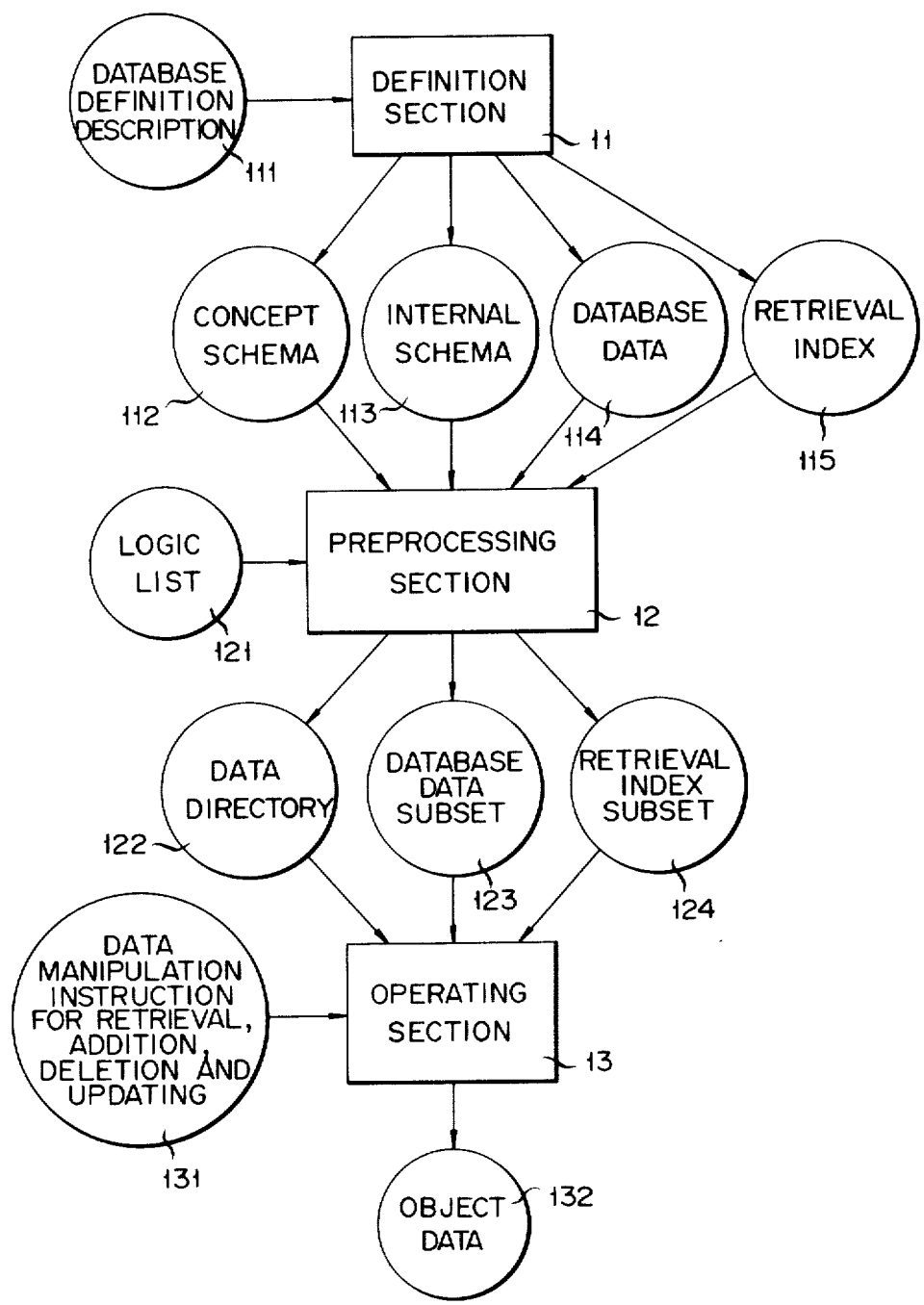
FIG. 2 is a conceptional view showing the construction of the data base management program to which the data access control method in the data base management system of the present invention is applied.

The present invention also relates to the data base management program having a construction as shown in detail in FIG. 2. Users define the data model using the data base definition language (hereinafter referred to as DDL) when building and storing the data base in the sub memory 5. The definition section 11, which is a part of the DBM, decodes the data base definition description 111 described using the DDL and generates a concept schema 112, an internal schema 113, data base data 114 and a retrieval index 115 in the sub memory 5. The concept schema 112 describes, logically, from the standpoint of data per se, the structure of all of the data in the real world that users intend to incorporate into the data base. The internal schema 113 describes the physical organization of the data in the data storage devices. The data base data (hereinafter may be referred to as DB) 114 is the set of data which is required to be physically organized. The retrieval index 115 is used for allocating data in order to easily process only the required retrieval items as specified by the data operation section. One significant difference between the construction shown in FIG. 2 and the prior art data base management system (DBMS) is that the preprocessing section 12 is placed prior to the operating section 13 so that high speed retrieval can be achieved. The preprocessing section 12 generates a data directory (abbreviated as D/D) 122, a data base subset (abbreviated as DB subset) 123 and a retrieval index subset (abbreviated as INDEX subset) 124 in accordance with a logic list 121 from the concept schema 112, the internal schema 113 and the data base 114 and the retrieval index 115. The D/D 122 is a subset of the concept schema 112 and the internal schema 113, and comprises logical information such as the length and the type of item specified in the logic list and physical information such as the physical location of an item in the computer storage device. The DB subset 123 is a summary of the item data information specified in the logic list 121, which is extracted from the data base. The retrieval items are located using the INDEX subset 124 in order to provide for easy operation of the DB subset 123. The logic list 121 is a description of which data set in the data base each task unit refers to as predefined by the user. The logic list 121 is accessed by the preprocessing section 12 prior to the execution of the operating section 13.

The logic list 121 and the preprocessing section 12 are stored in the second memory 71. The preprocessing section 12 is executed by the second processor 73. The preprocessing section 12 generates the data directory 122, the data base data subset 123 and the retrieval index subset 124, and stores them in the first memory 1. When the task unit uses data, the data manipulation instructions 131 are executed. A user inserts the data manipulation instruction in the necessary locations in the task unit. The task unit and the data manipulation instruction are executed by the first processor 3. When the data manipulation instruction is executed, the operating section 13 works to transfer the object data from the first memory 1 to the first processor 3. The logic list 121 is a description of the items and the access conditions of the data base data 114 to be used in a task unit. By retrieving the object schema of the items specified in the logic list 121, the D/D 122, the DB subset 123 and the INDEX subset 124 are generated and stored in the first memory 1 by the preprocessing section 12 in advance to the execution of the data manipulation instruction.

In an ordinary prior DBMS, which does not have the logic list 121, the preprocessing section 12, the data directory 122, the data base data subset 123 and the retrieval index subset. Therefore, the operating section 13 refers directly to the concept schema 112, the internal schema 113, the data base data 114 and the retrieval index 115 when the section 13 executes the data manipulation instruction 131. In the present invention, the preprocessing section calculates the physical informations and stores it in the D/D 122 as is specified by the logic list 121. Thus, when the data manipulation instruction is executed, the object data 132 in the first memory 1 can be accessed.

The following is an example of instructions 131. The instructions (1), (2), (4), (5), (6) and (7) are placed in the logic list which is located in each task unit. When this task unit is called for execution by the operating system, the list is loaded into the second memory 71 for the treatment by the second processor 73. While the other part of the task unit excluding the logic list is loaded in the first memory 1 for the execution by the first processor 3.

| | |
|---|---|
| CALL TRGTCNV ( . . ., target list, target directory) | (1) |
| CALL PRDCTCNV ( . . ., predicate list, value list, predicate directory) | (2) |
| CALL GET ( . . ., permit directory, target directory, predicate directory) | (3) |
| Target list: | (4) |
| SCADA: DAPR. TUPLENO, A, B, LIMIT 1, LIMIT 2// | (5) |
| Predicate list: | (6) |
| S (SCADA: DAPR. DTTYP) // | (7) |
| Value list: | (8) |
| P | (9) |

In the above statements (1) through (4), the broken lines show omittance. The above statements are taken from the example of retrieving data from the relational model named SCADA.

Figures 3, 4:
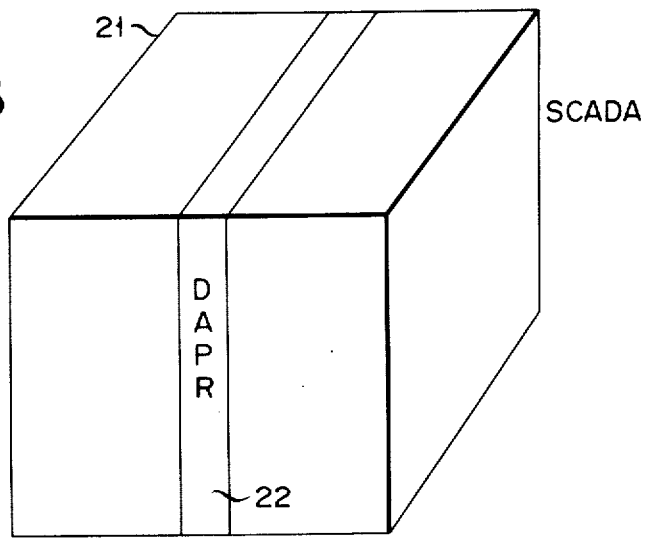
FIG. 3 is a conceptional view showing an example of the data model stored in the data base.
FIG. 4 is a table illustrating the relational model of the present invention.

FIGS. 3 and 4 show a part of the data model of the above example. FIG. 3 shows the data model wherein the reference numeral 21 denotes a schema. The schema is not a physical object but a logical abstract architecture and is represented as a two dimensional array 22. The array 22 is called a relation. One of the relations is illustrated for example by the table shown in FIG. 4. This table shows data used in a substation data monitoring system. In the table, "DUTNO" indicates the substation number, "ALMONO" alarm group number, "DTTYP" data types in which "P" represents power, "Q" reactive power, "V" a voltage and "F" frequency. Furthermore, "EUCON" represents the conversion parameter in electric units. In this case, the converted value is represented as follows.

Converted value $= AX + B$ (X: measure value)

Each row of the relation is called a tuple and each column thereof is called an attribute. Each entry box in the relation is called an item. The stored item include the required items which may be fetched and utilized as required. The statements (1) and (2) are instructions for the preprocessing section. The target list and the predicate list constitute the logic list 121. The example of the D/D 122 and the DB subset made by the preprocessing section are shown in FIGS. 5 and 6, respectively.

The statement (3) is a retrieval instruction which reads out the required DB data. The statements (1) through (9) show the instructions for finding the item having the value of P from the DTTYP items in the relation, for reading out the values in the column of TUPLENO, A, B, LIMIT 1 and LIMIT 2 from the row that the item belongs, and for loading in the register in the first processor 3 or in the specified location in the first memory 1. In the scope of this example, two sets of data (1, 2, 100, 300, 200) and (2, 2, 50, 250, 150) are taken out. In this example, the logic list shown by the statements (4) through (9) is interpreted by the preprocessing section 12.

In the computer, a plurality of tasks are activated concurrently under the control of the operating system. Each task calls the DBMS to access to the data base and to extract the desired data by executing the data manipulation instructions.

The following conditions are assumed for this embodiment of the present invention.

Figure 7:
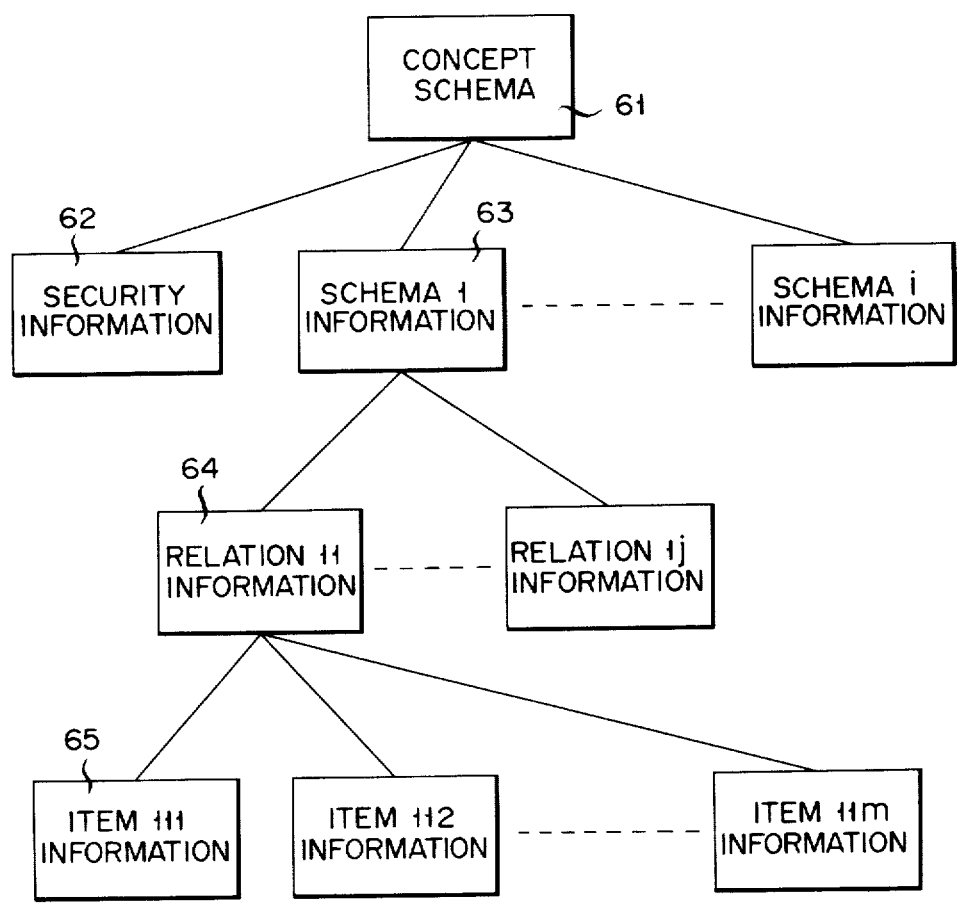
FIG. 7 is a conceptional view showing the tree structure for the concept schema of the present invention.
Figure 8:
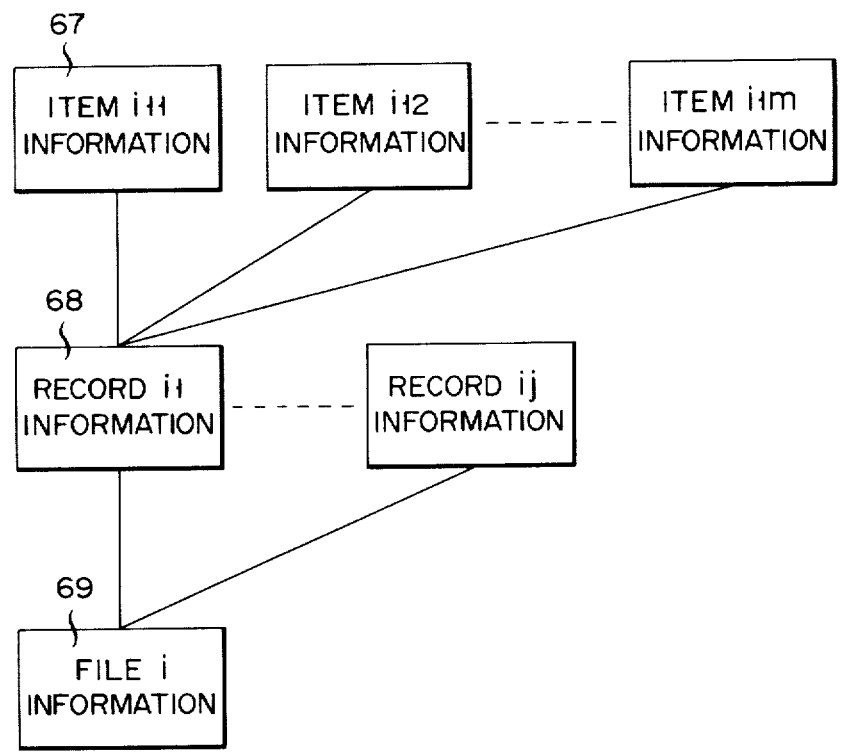
FIG. 8 is a conceptional view showing the tree structure for the internal schema of the present invention.

(1) The concept schema 112 and the internal schema 113 are generated at the definition section 11 and are stored in the sub memory 5 in the structures shown in FIG. 7 (the tree structure of the concept schema) and FIG. 8 (the tree structure of the internal schema).

(2) The data base data 114 is stored in the sub memory 5 in the order defined in the concept schema and the internal schema. The respective items of the data base in the sub memory 5 are grouped for each column. In each group, the items are arranged in sequential order.

The start location address in the group corresponds respectively to the set of the schema name, the relation name and the column name or the attribute name, which is called a triplet and represented by (x, y, z). Therefore, the location address of all the items can be defined using the triplet (x, y, z) and the index which defines the order specifying how many items there are from the top of the column.

(3) It can be considered that the item in the maximum range of the data base to which each task accesses during its execution is predictively defined corresponding to the task name before the computer system starts. Therefore, the predicted can be set before the system operates. The preprocessing instructions and the logic list are loaded into the second memory 71 corresponding to each task name when the task is invoked. When the operating system activates the task g in the first processor 3, the system sends signal to processor 73 for the fetch of the preprocessing instructions for the task g through the PIM 6 to the second processor 73. This signal contains the task name and the address of the first memory 1 where required data such as the data directory 122, the data base data subset 123 and the retrieval index subset 124 for the task g are being fetched. When the data manipulation instruction in the task is executed, the operating section 13 starts its operations. However, the operating section 13 is in a wait mode temporarily while the data directory 122, the data base data subset 123 and the retrieval index subset 124 are not ready in the first memory 1.

Suppose the item that the task operates on is contained in the schema x, the relation y and the column z, and its location is n-th from the start of the items in the column. The x, y and z are given from the target lists (4), (5) and the predicate lists (6) and (7), and are converted into a physical location when the second processor 73 executes the preprocessing instructions (1) and (2) corresponding to the task called by the operating system. The n is decided by the value list of the instructions (8) and (9) when the data operation instruction (3) is executed.

According to the present invention, the processor 73 generates the D/D, the DB subset and the INDEX subset in the first memory 1 in accordance with the target list and the predicate list. The flow charts for making this are shown in FIGS. 9 through 11.

Figure 9A:
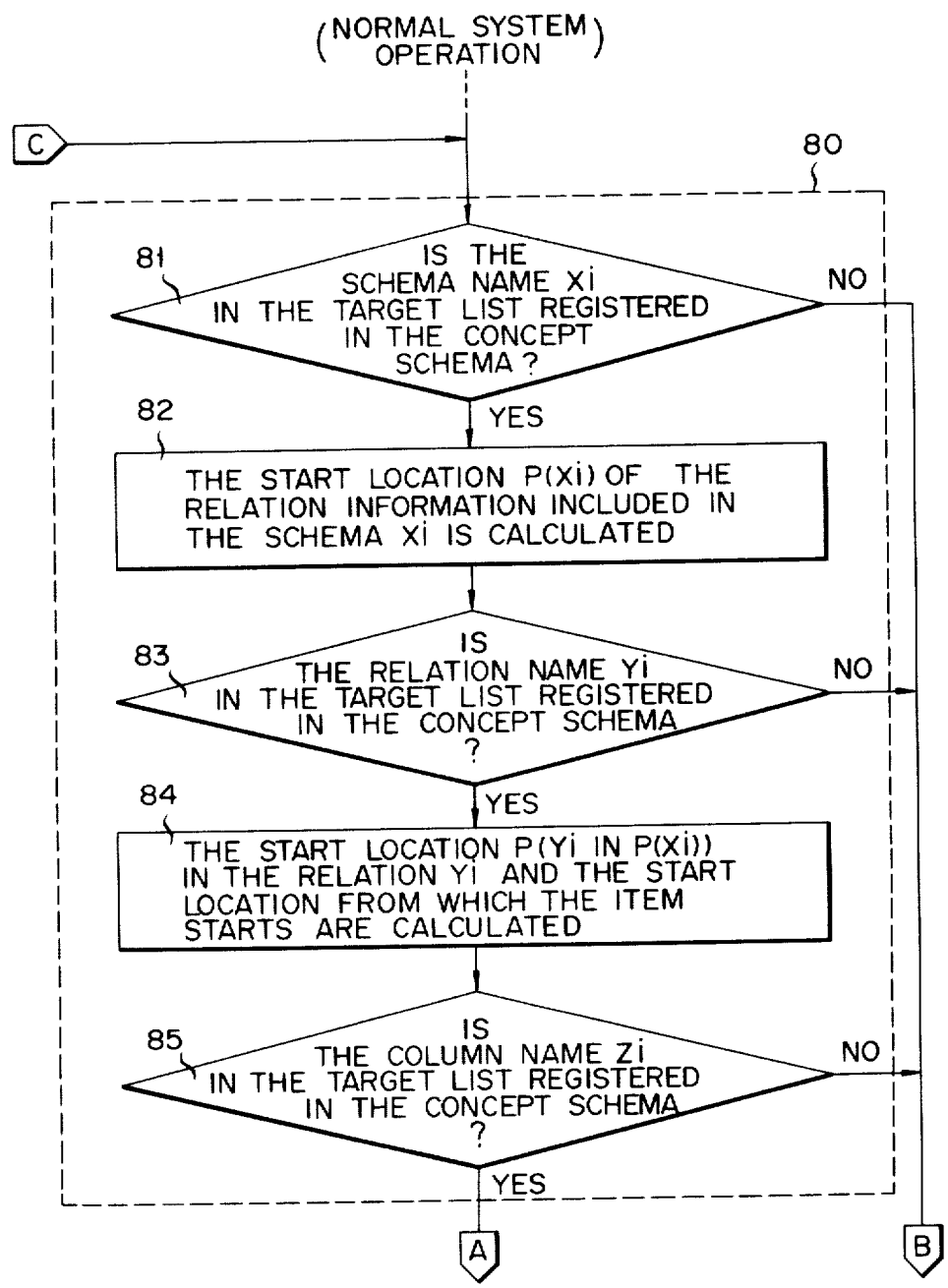
FIG. 9 is a flow chart of the processing program TRGTCNV of the present invention for generating the data directory and the data base subset from the target list.
Figure 9B:
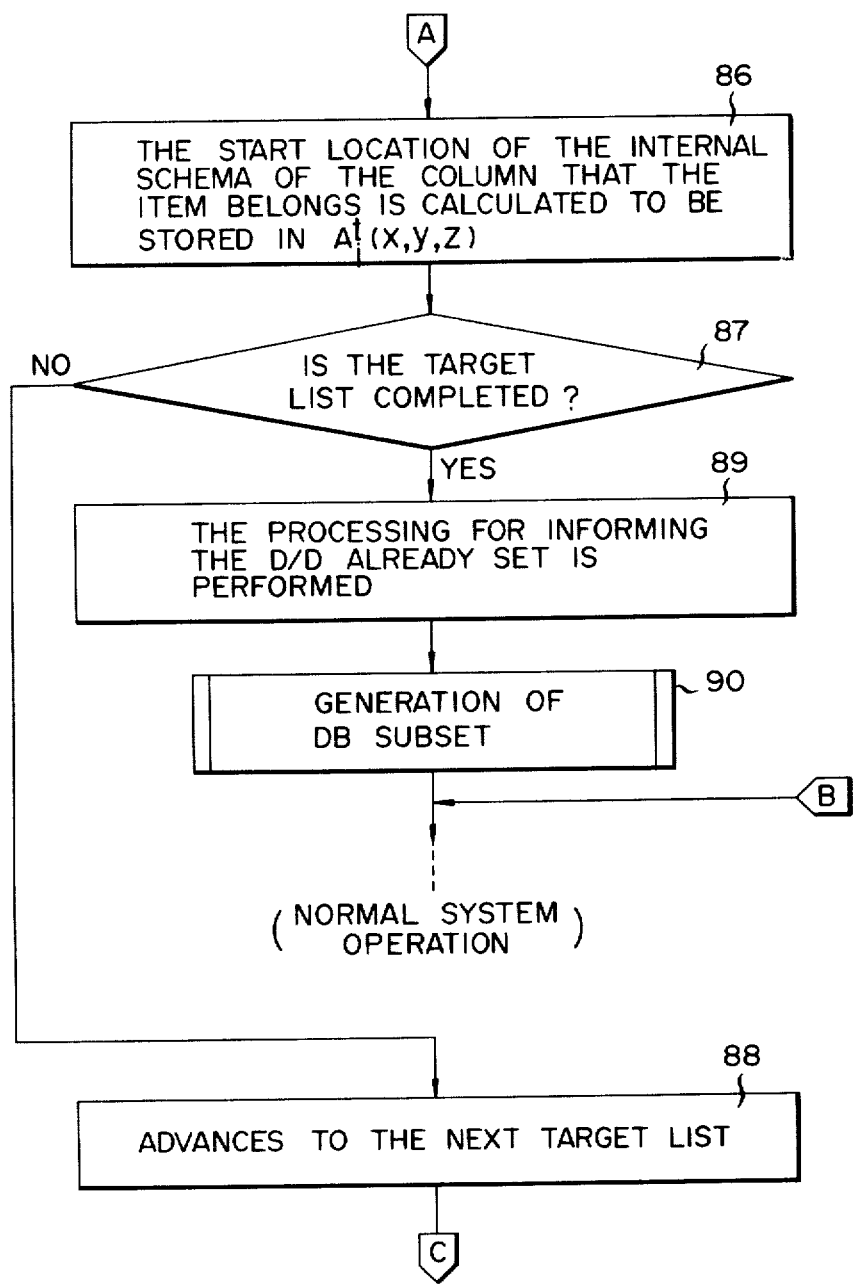

FIG. 9 shows the flow chart for processing TRGTCNV instruction in the preprocessing section which generates the D/D, the DB subset and the INDEX subset from the target list.

That is, in step 81 it is determined whether the schema name $x_i$ in the target list is registered in the concept schema. If it is registered, the start location $P(x_i)$ of the relation information included in the schema $x_i$ is determined. In step 83, it is determined whether the relation name $y_i$ in the target list is registered in the concept schema. If it is registered, the start location $R(P(x_i), Y_i)$ in the relation $y_i$ and the start location of the items are determined in step 84. In step 85, it is determined whether the column name $z_i$ in the target list is registered, in the concept schema. If it is registered the top address $A_i^t(x, y, z)$ of the location storing the internal schema of the column to which the item belongs is determined and is stored in the D/D. In step 87, it is determined whether processing of the target list has completed. If it is not completed, the processing for the next target list is carried out and the control goes back to step 81. On the other hand, if processing of the target list is completed, the step 89 is carried out which informs that the D/D has aleady been set. The DB subset is generated in step 90. The number i varies from 1 to the number of total items I included in the target list. The process 90 represents the procedures in which the DB subset is constructed using the D/D.

Figure 10:
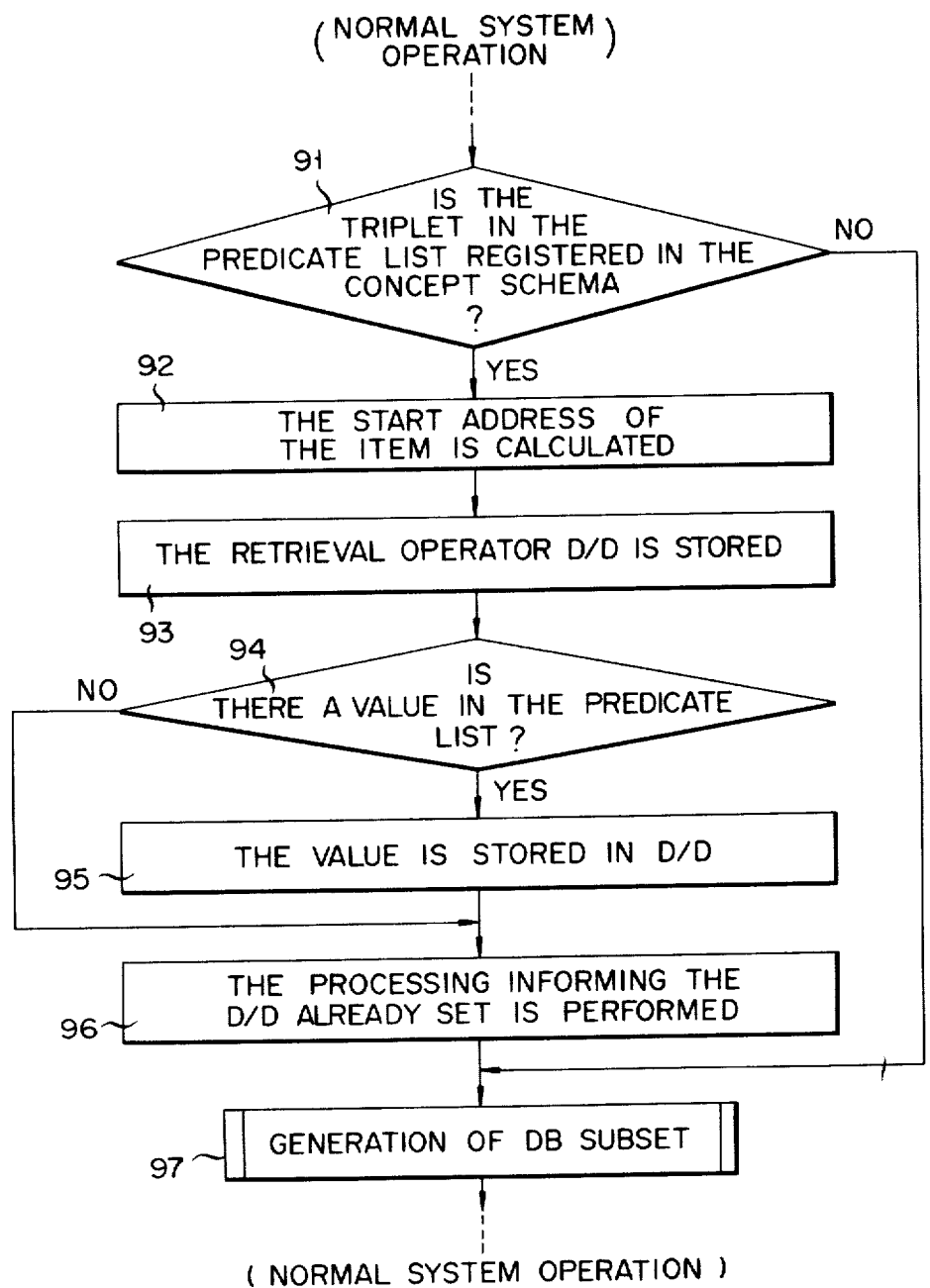
FIG. 10 is a flow chart of the processing program PRDCTCNV of the present invention for storing the retrieval condition in the data directory from the predicate list.

FIG. 10 shows the flow chart for processing PRDCTCNV instruction which stores the retrieval conditions in the D/D from the predicate list. That is, in step 91 it is determined whether the triplet in the predicate list is registered in the concept schema. If it is registered, the start address of the item is determined in step 92 and in step 93 the retrieval operator is stored in the D/D. In step 94, it is determined whether the value is included in the predicate list. If it is determined that the value is included, the value is stored in the D/D in step 95. In step 96, the processing to determine if the retrieval condition has been set is performed and the DB subset is generated in step 97. Also included in the process 97 is a procedure for generating the DB subset and is the same as step 90 of FIG. 9. $A_j^p(x, y, z)$, represents the top address of the location storing the internal schema of the column to which the item belongs, where j varies from 1 to the number of total items J included in the predicate list.

FIG. 11 is a flow chart of the program for making the DB subset defined in step 90 of FIG. 9 and 97 of FIG. 10. That is, in step 101 D/D is checked to determine if it has already been set. If D/D has already been set, step 102 checks whether the retrieval condition has already been set. If it has already been set, the location of the data is identified by $A_j^p(x, y, z)$ and sent to the first memory 1 in step 103. Step 104 determines whether the value in the predicate list is set or not. If it is set, it is checked to determine whether the removed tuple satisfies the condition in accordance with the retrieval value and the retrieval operator. If the conditions satisfied, the item data of the column starting from the corresponding $A_i^t(x, y, z)$ in the tuple are stored in the DB subset. In step 107, the index keys are made, for example, using the hash method (which is known and used for constructing the retrieval index) from the addresses $A_j^p(x, y, z)$ (j=1, 2, . . . , j). Furthermore, the index keys are stored in the INDEX subset in step 108. Step 109 checks the data of DB to determine whether it is completed. If it is not completed, then the control returns to step 103, otherwise the processing is carried out as if the DB subset has already been set in step 110. The execution order between TRGTCNV instruction and PRDCTCNV instruction is arbitrary. However, to generate the DB subset the processing by both of the instructions must be completed normally or in a "completion state". Such ordinary processing is possible by confirmation of both steps 101 and 102.

An example of arrangement of DB subset and INDEX subset in the first memory 1 is shown in FIGS. 12 and 13. When all of the necessary DB data are processed, the "completion condition" of the DB subset is stored in the first memory 1. The completion condition is utilized to confirm whether the DB subset can be utilized when the actual retrieval instructions (3), (8) and (9) are processed. In FIG. 12, $a_1, \ldots, a_M$ indicate the top address of the locations for storing item data in each tuple of the DB subset. M represents the number of total tuples included in the DB subset.

FIG. 13 is an INDEX subset structured using the binary search division method (a known index technology explained in COMPUTER DATA-BASE ORGANIZATION 2nd Edition by James Martin, 1975, pages 334–335, Chapter 30, and pages 653–655) and the following relation is achieved.

Value of Index $i \leq$ Value of Index $(i+1)$ wherein $1 \leq i \leq (I-1)$. Symbol $b_1, \ldots, b_M$ indicate the top address of the locations for storing the index for each tuple in the INDEX subset.

Figure 15A:
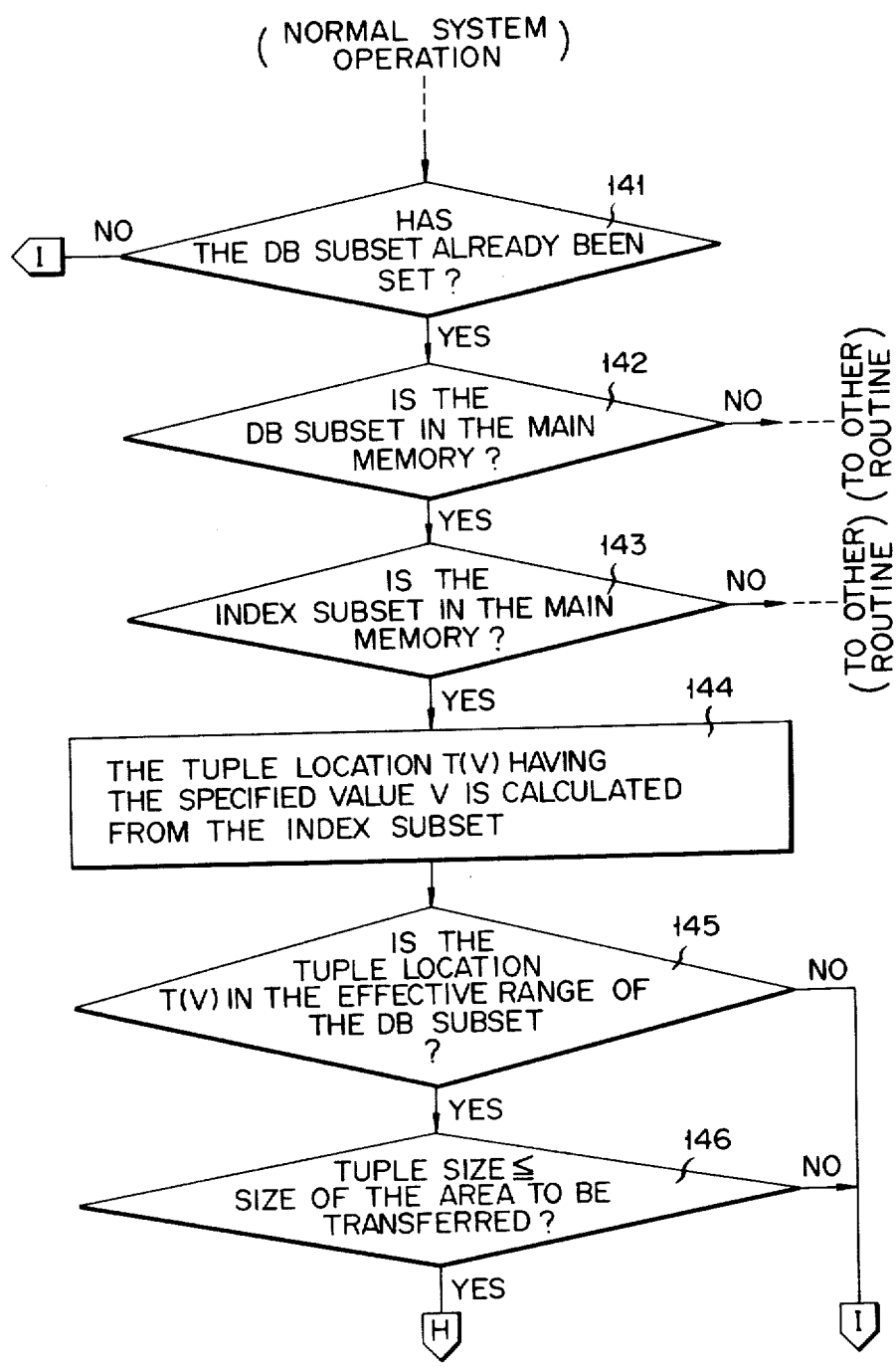
FIG. 15 is a flow chart showing the processing program GET for reading out the data base of the present invention.
Figure 15B:
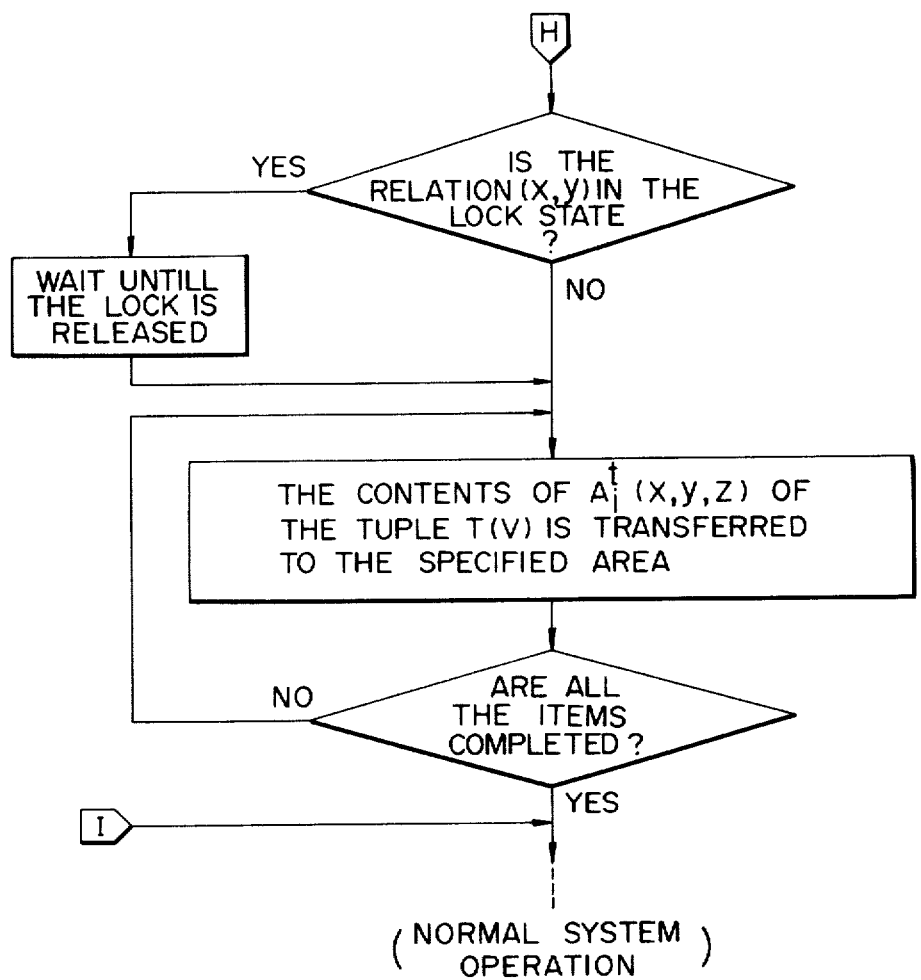

The preprocessing section is completed by the above operations and the DB subset, the D/D and the INDEX subset are generated in the first memory 1. The operating section consists of reading or writing functional modules which can be utilized in the same manner as a subroutine call. An example of the subroutine call instruction and its parameters (the information to be transferred to the processing program from the request side and the information to be received) are shown in FIG. 14. The parameters underlined show the parameters to be received by the caller. To clarify the relation between the preprocessing section and the operation section, the program GET for reading the data base will be described hereinafter. The flow chart of GET is shown in FIG. 15. Step 141 determines if the DB subset has been created. If it has been created, then step 142 determines if the DB subset is in the first memory 1. If it is in the first memory 1, step 143 determines if the INDEX subset is in the first memory 1. If it is in the first memory 1, the tuple location T(V) having the specified value V is determined from the INDEX subset. Step 145, determines if the tuple location T(V) is in the effective range of the DD. If it is in the range, then the tuple size is compared to the transfer size in step 146. If it is smaller than or equal to the transfer size, it jumps to step 147. Step 147, determines if the relation (x, y) is in the lock state. If it is in the lock state, step 148 delays execution until the lock is released. If it is not in the lock state, the contents of $A_i^t(x, y, z)$ of the tuple T(V) are transferred to the specified area. Step 150, determines if all of the items are completed. If any are not completed, the program returns to step 149.

FIG. 15 shows the example of the processing when both the DB subset and the INDEX subset are placed in the first memory 1. In the example of GET in FIG. 15, the DB subset and the INDEX subset need not being modified and the prescribed operation is repeated. In the case of some other operations (UPDATE, PUT), the contents of the DB subset and the INDEX subset are modified. When modified data are used in another task, it is required that the modifications are reflected in the data base data 114 and the retrieval index 115 to hold the consistency of the data base. The processing is such that prior to the execution of the preprocessing section 12 by the second processor 73, the variation of the data base is checked in the second processor 73. If it is varied or intended to be varied, the execution of the preprocessing section 12 is suspended until the modification of the data base is completed. After completion, the data base data subset 123 is transferred to the sub memory 5 from the first memory 1 by the second processor 73. By the above operation, the consistency of the data base can be retained.

Figure 16:
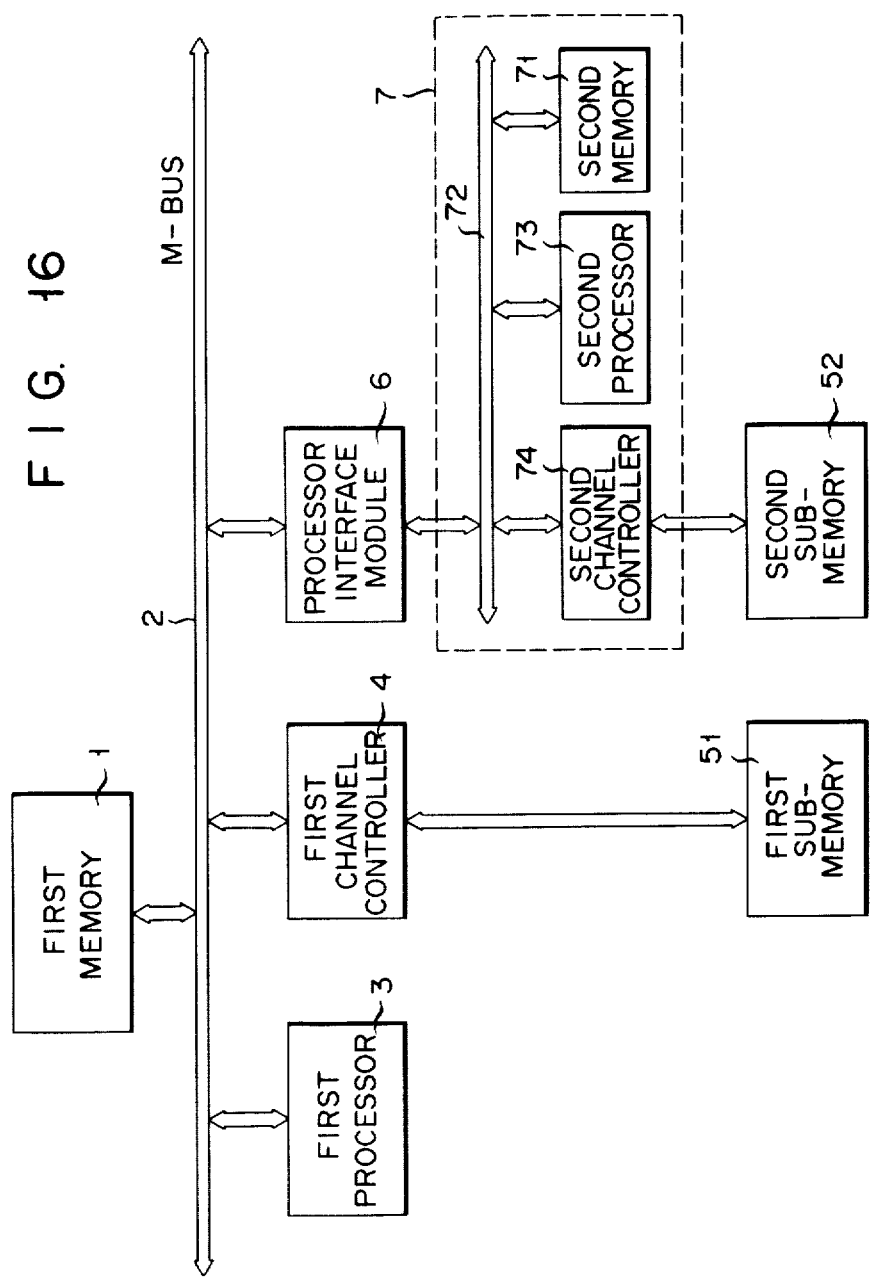
FIG. 16 is a block diagram showing a modification of the embodiment of FIG. 1.

FIG. 16 shows a modification of the embodiment shown in FIG. 1. In the embodiment shown in FIG. 1, both the task unit and the data base are stored in the sub memory 5. On the other hand, in the modification shown in FIG. 16, the task unit is stored in the first sub memory 51, while the data base and the part of each task unit which contains logic list 121 is stored in the second sub memory 52, separate from the task unit. In the embodiment shown in FIG. 1, there is a chance of having to wait for the transfer request since the transfer switching of the channel controller 4 and the channel controller 74 is controlled by multi-access controller 8. In the modification shown in FIG. 16, the transfer from the sub memory for executing the task unit by the first processor 3 and the transfer from the sub memory for the preprocessing process by the second processor 73 can be performed independently.

What we claim is:

1. A method for controlling data access in a computer having first storage means and second storage means, both for storing data required to execute a program including at least one data operation instruction, comprising the steps of:
    transferring data required by said data operation instruction from said second storage means to a location in said first storage means, prior to execution of said data operation instruction; and
    informing the data operation instruction of the address of said location of the data required thereby, prior to execution of the data operation instruction.

2. A method for controlling data access in a computer, comprising the steps of:
    storing information in a second storage means;
    executing a task by a first processing means and sending a task identification description to a second processing means as a task unit is executed;
    referring to said second storage means by said second processing means;
    transferring object items stored in said second storage means to a third storage means by said second processing means;
    transferring the object items stored in said third storage means to locations in said first storage means;
    informing a data operation instruction of the address of a required object item in said first storage means, prior to execution of said data operation instructon;
    accessing said required object item by said first processing means; and
    executing said data operation instruction by said first processing means.

3. An apparatus for controlling data access in a data base management system comprising:
    second storage means for storing a data base having a predetermined relational model and programs including at least one task unit having at least one data operation instruction for executing retrieval, addition, deletion and updating of the data base;
    first central processing means, connected to said second storage means, for executing each said task unit stored in said second storage means;
    first storage means, connected to said first central processing unit, for storing programs and data to be executed by said first central processing means;
    second central processing means, connected to said first central processing means through an interface means and connected to said second storage means; and
    third storage means, connected to said second central processing means, for storing programs and data to be executed by said second central processing means, whereby said first central processing means executes the task unit read out from said second storage means, while said second central processing means reads out the data from said second storage means specified by the data operation instruction included in the task unit, based on the parameter supplied from said first central processing means and stores the data read out from the second storage means in said first storage means through said third storage means and the address of the location in which the data from the second storage means is stored in a predetermined location of said first storage means.

4. An apparatus for controlling data access in a data base management system according to claim 3, wherein said second storage means comprises a first sub storage means and a second sub storage means and said first sub storage means is connected to said first central processing means to store each said task unit while said second sub storage means is connected to said second central processing means to store the data base.

5. An apparatus for controlling data access in a data base management system, comprising:
    first storage means for storing data required to execute a program, said program including at least one data operation instruction;
    second storage means for storing the data required to execute a program;
    first processing means for executing the program;
    second processing means for transferring data required by said data operation instruction from said second storage means to a location in said first storage means, prior to execution of said data operation instruction, in response to a signal from said first processing means; and
    bus means for interconnecting said first storage means, said second storage means, said first processing means and said second processing means.

6. An apparatus according to claim 5, wherein said second processing means comprises:
    interface means for interfacing said first processing means and said second processing means.

7. An apparatus according to claim 6, further comprising:

multi-access control means for multiple accessing said second storage means by said first processor means and said second processor means.

8. An apparatus according to claim 7, further comprising:
first channel control means for controlling the channels between said first storage means and said second storage means.

9. An apparatus according to claim 8, wherein said second processing means further comprises:
second channel control means for controlling the channels between said first storage means and said second storage means, and a third storage means for storing data required by said second processing means.

* * * * *